April 20, 1954     M. M. SEARS     2,675,783
HOG LOADING CHUTE
Filed Nov. 12, 1952     2 Sheets-Sheet 1
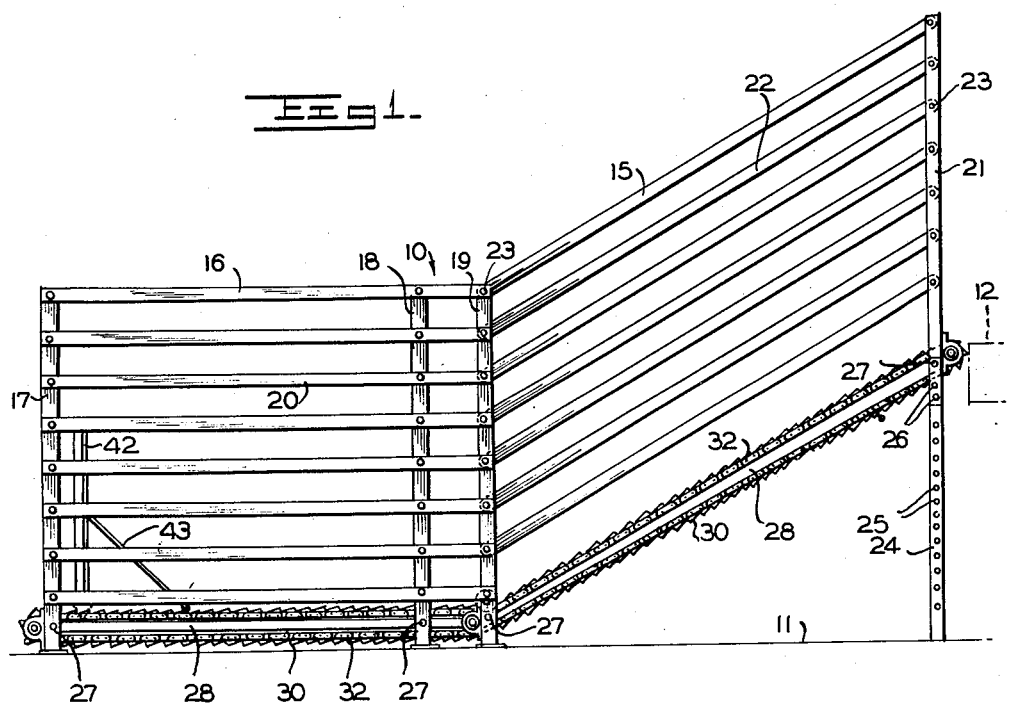
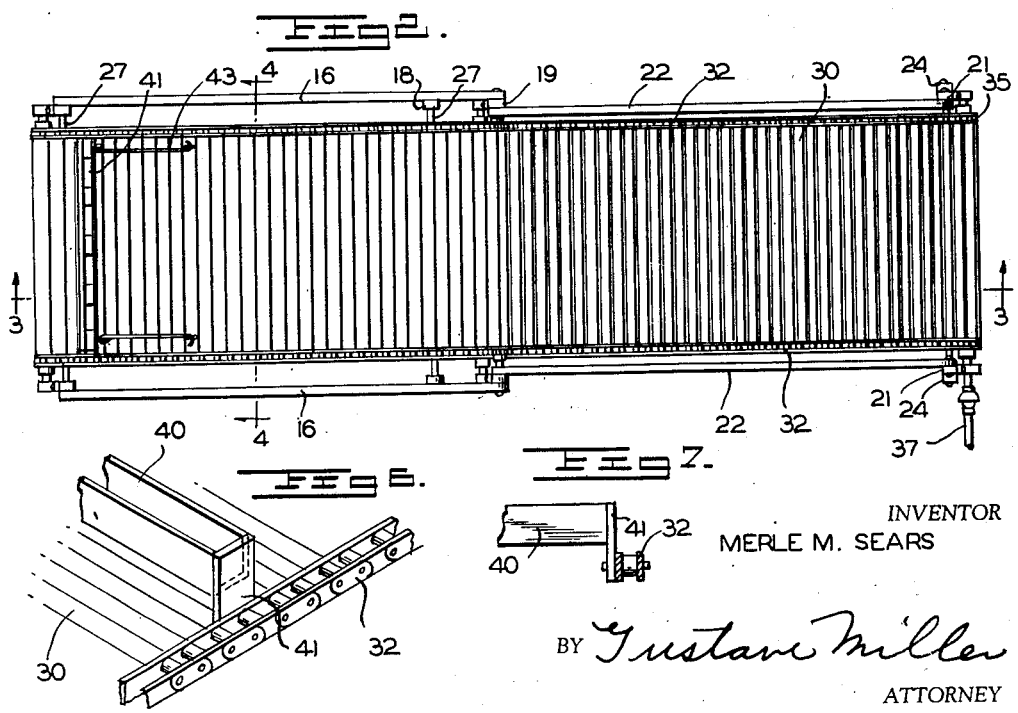
INVENTOR
MERLE M. SEARS
BY *Gustave Miller*
ATTORNEY

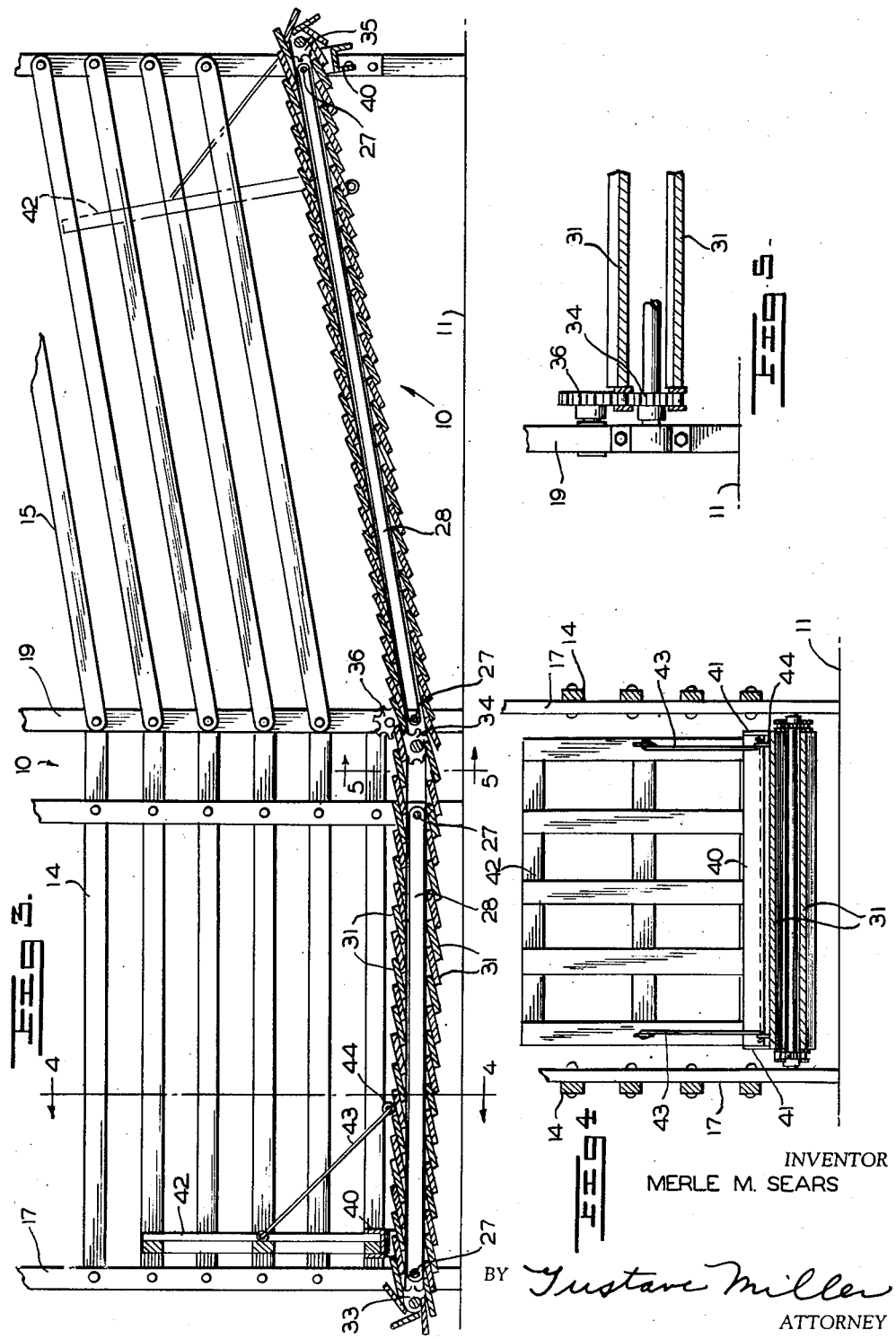

Patented Apr. 20, 1954

2,675,783

UNITED STATES PATENT OFFICE 2,675,783

HOG LOADING CHUTE

Merle M. Sears, Cedar, Kans.

Application November 12, 1952, Serial No. 319,883

1 Claim. (Cl. 119—82)

This invention relates to a hog loading chute and has for an object to provide a hog loading chute particularly designed for the individual hog raiser or producer for enabling him to lower his hog on to a stock struck or other vehicle with the minimum of effort and without any damage to the meat.

A further object of this invention is to provide a loading chute not only useful for loading hogs, but equally usable for loading other types of stock, such as cattle and sheep, and for loading such stock from a lower level as the ground to the floor of a truck or stock car.

It is conventional to provide an inclined chute for loading hogs or other stock on a vehicle, but particularly in the case of hogs, it is difficult to cause the hogs to either enter the chute or to climb the chute, and it is usually necessary to whip or beat the hog in order to make the hog climb up the chute, causing both difficulty in the loading process and damage or bruises on the meat, often times rendering such damaged portions of meat unfit for consumption. It is not at all difficult to cause the hogs or other stock to enter a level runway, but it is usually difficult to cause the stock, particularly the hogs, to climb up an inclined runway, and it is an object of this invention to provide a combined level runway and inclined chute so that the hogs or stock will easily enter the level runway portion, and then may be carried by means of a movable endless platform from the level runway to and up the inclined chute to the level of the floor of the vehicle or stock car and to cause the hogs or stock to thus enter the vehicle with a minimum of difficulty.

A further object of this invention is to provide a stock loading apparatus having a stock confining level runway and an attached stock confining inclined chute with an endless movable platform or floor along the runway and chute for carrying the stock thereon to the discharge end of the chute, and also to provide means for adjustably varying the elevation of the discharge end of the chute according to the height of the vehicle which is being loaded.

With the foregoing and other objects in view, this invention comprises the combination, construction and arrangement of parts hereinafter set forth, claimed and disclosed in the accompanying drawings, wherein:

Fig. 1 is a side elevation view of the hog loading chute of this invention.

Fig. 2 is a top plan view of Fig. 1.

Fig. 3 is a sectional view on line 3—3 of Fig. 2.

Fig. 4 is a transverse section on line 4—4 of Fig. 2.

Fig. 5 is an enlarged detailed fragmentary view on line 5—5 of Fig. 3.

Fig. 6 is an enlarged perspective fragmentary view showing the gate attaching channel.

Fig. 7 is an enlarged fragmentary detail showing the channel attachment to the chain.

There is shown at 10 the stock or hog loading chute or apparatus of this invention particularly intended for loading hogs or other stock from the ground level 11 to a vehicle or truck floor 12. This apparatus 10 includes a runway 14 and an attached inclined chute 15. The runway 14 has a pair of stock confining fences 16 including uprights 17, 18 and 19, to which a plurality of fence bars 20 may be rigidly secured. The chute 15 includes one of these same uprights 19 and a second upright 21, to which its fence bars 22 are pivotedly secured as at 23. A telescopic upright 24 is provided for each of the discharge end uprights 21 and may be adjustably secured thereto at any desired elevation by means of pins inserted through cooperating transverse apertures 25 and 26.

As a result of this construction, it is easily possible to adjust the discharge end of the chute 15 to the height of the vehicle floor 12 which is being loaded.

Transverse rods or bars 27 are secured adjacent the bottom of each pair of uprights 17, 18, 19 and 21, and provide means for supporting platform longitudinals 28 therealong. Movably supported over these platform longitudinals 28 is an endless movable platform or floor 30, which may be made up of a plurality of individual slats 31, each individually secured between a pair of sprocket chains 32, which in turn are meshed about sprocket gears 33 at the entrance end of the runway 14, a second set of sprocket gears 34 where the runway 14 is attached to the chute 15, a third set of sprocket gears 35 at the discharge end of the chute 15. A fourth set of sprocket gears 36 rotatably mounted on the uprights 19, as shown, act as idler gears at the top of the upper portion of the sprocket chains at the juncture point between the runway 14 and chute 15 to thereby hold the upper portion of the sprocket chain in mesh with the upper portion of sprocket gears 34.

As shown, a manually operable crank handle 37 is connected to the discharge sprocket gears 35 for rotating the same and thus causing the operation of the sprocket chain 32 and thus control the movement of the endless movable platform 30 as desired. Obviously, a power motor of any nature could provide the power for rotating the sprocket 35 or for rotating any of the sprocket gears to cause the desired movement.

While the fence bars 20 and 22 serve to confine the stock or hogs on the platform 30, it is necessary to provide additional means for insuring that the hogs or stock advance when the platform is moved, and this consists of at least one or more gate receiving channels 40 secured as by an upright 41 to each sprocket chain 32. A gate 42 of suitable size has its lower end supported in channel 41 and is provided with a pair of brace rods 43 having hooks at their ends for attachably securing the same in eyes 44 located in one of the slats 31 at the proper distance from the channel 40. While only one channel 40 is necessary for the operation of this invention, for convenience, a second channel 40 may be so located along the platform 30 that when the channel 40 having the gate 42 is at the entrance end of runway 14, the second channel 40 will have just passed the discharge end of the inclined chute 15, so that when the gate 42 has been advanced to the discharge end and is removed therefrom, it will be necessary to move the floor only a slight distance to have another channel 40 ready to receive the gate 42 in position again.

In operation, the hog or other stock is easily driven into the open entrance end of the runway 14, whereupon the attachable gate 42 has its bottom end dropped into the channel 40 and then the braces 43 are hooked to the eyes 44 to thus hold the gate 42 in upright position. Next, the crank handle 37 or other power means is operated to cause the endless platform to advance and carry the hog or stock on the movable platform 40 up to the discharge end of the inclined chute 15, whereupon the hogs or other stock will readily mount the vehicle platform 12 due to the pressure of the gate 42 moving up behind it. Then the gate 42 has its braces 43 unhooked, the gate 42 is lifted out of the channel 40, and the floor is advanced a slight amount to bring the other channel 40 in position, another hog is driven into the runway and the operation is repeated until the loading is completed.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

A stock loading apparatus comprising a level runway and an inclined chute movably secured together at an abutting end of each, a fence means on each side of said runway and said chute extending from the non-abutting ends thereof, said fence means including horizontal bars pivotally arranged at the abutting ends of said runway and said chute for relative movement therewith, an endless platform movably mounted on said runway and said chute and being adapted to carry stock between said fence means from said runway to a point of discharge at the non-abutting end of said chute, at least one channel member secured at each end to said platform at opposite sides thereof adjacent said fence means and having its open side upwardly directed, an upstanding stock gate having an upper end and a lower end removably supported at its lower end in the open side of said channel member, and a pair of brace rods secured one to each side of said stock gate adjacent said fence means and midway between the upper and lower ends thereof, each of said pair of brace rods having a hook at the end remote from said stock gate, and an eye secured at a spaced distance from said gate to each side of said platform and being adapted to releasably engage the hook of the opposed one of said pair of brace rods whereby said pair of brace rods and said channel member support said stock gate in a substantially vertical position as it is carried on said platform through said runway and to the point of discharge of said chute.

References Cited in the file of this patent
UNITED STATES PATENTS

| Number | Name | Date |
|---|---|---|
| 507,122 | Harrington | Oct. 24, 1893 |
| 873,272 | Sheley | Dec. 10, 1907 |
| 1,360,082 | Bort | Nov. 23, 1920 |
| 1,717,843 | Hollnagel | June 18, 1929 |
| 2,526,037 | Murphy | Oct. 17, 1950 |